(12) United States Patent
Dolby et al.

(10) Patent No.: US 10,621,333 B2
(45) Date of Patent: Apr. 14, 2020

(54) INSTALL-TIME SECURITY ANALYSIS OF MOBILE APPLICATIONS

(71) Applicant: International Business Machines Corporation, Armonk, NY (US)

(72) Inventors: Julian T. Dolby, Bronx, NY (US);
Pietro Ferrara, Whiteplains, NY (US);
Marco Pistoia, Amawalk, NY (US);
Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 15/231,093

(22) Filed: Aug. 8, 2016

(65) Prior Publication Data
US 2018/0039774 A1 Feb. 8, 2018

(51) Int. Cl.
*G06F 21/51* (2013.01)

(52) U.S. Cl.
CPC ........ *G06F 21/51* (2013.01); *G06F 2221/033* (2013.01)

(58) Field of Classification Search
CPC ..... H04L 63/1441; H04L 21/50; H04L 21/51; G06F 21/562; G06F 21/56; G06F 21/566
USPC .......................................................... 726/23
See application file for complete search history.

(56) References Cited

U.S. PATENT DOCUMENTS

| 7,680,758 | B2 * | 3/2010 | Laborczfalvi | ........... G06F 9/468 |
| | | | | 707/999.001 |
| 8,745,746 | B1 * | 6/2014 | Jain | ...................... H04L 63/145 |
| | | | | 726/25 |
| 8,973,090 | B1 * | 3/2015 | Banerjee | ................. G06F 21/51 |
| | | | | 726/1 |
| 9,178,852 | B2 * | 11/2015 | Bettini | ................ H04L 63/0245 |
| 9,202,049 | B1 * | 12/2015 | Book | ....................... G06F 21/56 |
| 9,576,130 | B1 | 2/2017 | Book et al. | |
| 9,633,199 | B2 * | 4/2017 | Calcaterra | ............... G06F 21/74 |
| 9,781,151 | B1 * | 10/2017 | McCorkendale | ... H04L 63/1441 |
| 10,176,325 | B1 * | 1/2019 | Hou | ...................... G06F 21/566 |
| 2002/0013910 | A1 * | 1/2002 | Edery | ..................... G06F 21/52 |
| | | | | 726/24 |

(Continued)

OTHER PUBLICATIONS

Viswanathan et al., A Survey of Isolation Techniques, Google Search (Year: 2013).*

(Continued)

*Primary Examiner* — Kambiz Zand
*Assistant Examiner* — Mahabub S Ahmed
(74) *Attorney, Agent, or Firm* — Scully, Scott, Murphy & Presser, P.C.; Daniel Morris, Esq.

(57) ABSTRACT

Online security analysis is provided by installing an analysis agent on a mobile device. The analysis agent monitors the mobile device to detect an initiation of installation for a new application that is to be installed on the mobile device. In response to the initiation of installation, the analysis agent quarantines a set of resources corresponding to the new application; analyzes the set of resources to determine whether or not at least one of a potential security threat or a security misconfiguration exists; and, in response to determining that at least one of the potential security threat or the security misconfiguration exists, generates an alert for informing a user that the potential security threat or the security misconfiguration exists.

17 Claims, 3 Drawing Sheets

(56) References Cited

U.S. PATENT DOCUMENTS

| | | | | |
|---|---|---|---|---|
| 2005/0091655 A1* | 4/2005 | Probert | G06F 8/62 | 719/315 |
| 2006/0195745 A1* | 8/2006 | Keromytis | G06F 11/0742 | 714/741 |
| 2006/0265761 A1* | 11/2006 | Rochette | G06F 21/53 | 726/27 |
| 2008/0172746 A1* | 7/2008 | Lotter | G06F 21/552 | 726/26 |
| 2008/0189550 A1* | 8/2008 | Roundtree | G06F 21/51 | 713/176 |
| 2008/0244704 A1* | 10/2008 | Lotter | G06F 21/552 | 726/3 |
| 2009/0064334 A1* | 3/2009 | Holcomb | G06F 21/554 | 726/24 |
| 2009/0100519 A1* | 4/2009 | Tarbotton | G06F 21/554 | 726/23 |
| 2009/0177567 A1* | 7/2009 | McKerlich | G06Q 30/04 | 705/35 |
| 2009/0254993 A1* | 10/2009 | Leone | G06F 21/51 | 726/25 |
| 2010/0003923 A1* | 1/2010 | McKerlich | H04L 12/14 | 455/67.11 |
| 2010/0242111 A1* | 9/2010 | Kraemer | G06F 21/55 | 726/22 |
| 2011/0083186 A1* | 4/2011 | Niemela | G06F 21/566 | 726/24 |
| 2011/0138463 A1* | 6/2011 | Kim | H04L 63/1425 | 726/22 |
| 2012/0137367 A1* | 5/2012 | Dupont | G06F 21/00 | 726/25 |
| 2012/0157039 A1* | 6/2012 | Lotter | G06F 21/552 | 455/405 |
| 2012/0221485 A1* | 8/2012 | Leidner | G06Q 10/0635 | 705/36 R |
| 2013/0019313 A1* | 1/2013 | Piccinini | G06F 21/564 | 726/24 |
| 2013/0055338 A1* | 2/2013 | McDougal | G06F 21/56 | 726/1 |
| 2013/0067576 A1* | 3/2013 | Niemela | G06F 21/568 | 726/24 |
| 2013/0067577 A1* | 3/2013 | Turbin | G06F 21/56 | 726/24 |
| 2013/0212684 A1* | 8/2013 | Li | G06F 17/30522 | 726/25 |
| 2013/0232576 A1* | 9/2013 | Karnikis | G06F 21/56 | 726/24 |
| 2013/0239214 A1* | 9/2013 | Klein | G06F 21/566 | 726/24 |
| 2013/0283377 A1* | 10/2013 | Das | G06F 21/51 | 726/23 |
| 2013/0305377 A1* | 11/2013 | Herz | G06Q 20/201 | 726/25 |
| 2013/0318613 A1 | 11/2013 | Archer et al. | | |
| 2014/0068767 A1* | 3/2014 | Mao | G06F 21/554 | 726/23 |
| 2014/0298420 A1 | 10/2014 | Barton et al. | | |
| 2014/0321646 A1* | 10/2014 | Ksontini | H04L 63/0853 | 380/247 |
| 2014/0331281 A1* | 11/2014 | Bettini | H04L 63/0245 | 726/1 |
| 2015/0121536 A1* | 4/2015 | Xing | G06F 21/12 | 726/26 |
| 2015/0161386 A1* | 6/2015 | Gupta | G06F 11/3612 | 726/23 |
| 2015/0220734 A1* | 8/2015 | Nalluri | G06F 21/51 | 726/23 |
| 2015/0244729 A1* | 8/2015 | Mao | H04L 63/145 | 726/24 |
| 2015/0261519 A1* | 9/2015 | Hsieh | G06F 8/65 | 717/173 |
| 2015/0261954 A1* | 9/2015 | Xue | G06F 21/554 | 726/23 |
| 2015/0278729 A1* | 10/2015 | Hu | G06Q 10/0635 | 705/7.28 |
| 2015/0286820 A1* | 10/2015 | Sridhara | G06F 21/566 | 726/23 |
| 2015/0288720 A1* | 10/2015 | Touboul | G06F 21/51 | 726/1 |
| 2016/0044049 A1* | 2/2016 | Xing | H04L 63/14 | 726/23 |
| 2016/0050226 A1* | 2/2016 | Bettini | H04L 63/105 | 726/1 |
| 2016/0070911 A1* | 3/2016 | Okereke | G06F 21/56 | 726/23 |
| 2016/0085970 A1* | 3/2016 | Rebelo | G06F 21/51 | 726/25 |
| 2016/0127367 A1* | 5/2016 | Jevans | H04L 63/1433 | 713/152 |
| 2016/0191645 A1* | 6/2016 | Hayton | G06F 9/547 | 709/203 |
| 2016/0344765 A1* | 11/2016 | Shiell | H04L 63/1458 | |
| 2016/0378578 A1* | 12/2016 | Nandakumar | G06F 8/20 | 719/328 |
| 2016/0381069 A1* | 12/2016 | Chesla | H04L 45/74 | 726/23 |
| 2017/0090910 A1* | 3/2017 | DeLuca | G06F 8/654 | |
| 2017/0091617 A1* | 3/2017 | Baughman | G06N 3/0472 | |
| 2017/0118237 A1* | 4/2017 | Devi Reddy | G06N 7/005 | |
| 2017/0206071 A1* | 7/2017 | Kirkpatrick | G06F 8/61 | |
| 2017/0286141 A1* | 10/2017 | Adler | G06F 9/45504 | |
| 2018/0219917 A1* | 8/2018 | Chiang | G06Q 10/0635 | |
| 2018/0285797 A1* | 10/2018 | Hu | G06Q 10/0635 | |

OTHER PUBLICATIONS

McKeen et al., Innovative Instructions and Software Model for Isolated Execution, Google Search (Year: 2013).*

Tripp et al., "A Bayesian Approach to Privacy Enforcement in Smartphones", Proceeding of the 23rd USENIX conference on Security Symposium, SEC'14, San Diego, CA, Aug. 20-22, 2014, pp. 175-190.

Enck et al., "TaintDroid: An Information-Flow Tracking System for Realtime Privacy Monitory on Smartphones", ACM Transactions on Computer Systems, vol. 32, No. 2, Article 5, Publication date: Jun. 2014, pp. 5:1 - 5:29.

* cited by examiner

INSTALL-TIME SECURITY ANALYSIS OF MOBILE APPLICATIONS

FIELD

The present application relates generally to mobile applications and, more particularly, to techniques for addressing potential threats to privacy and integrity when installing applications on mobile devices.

BACKGROUND

The mobile era brings with it exciting possibilities to contextualize computations. Notable examples include location-based services, contextual recommendation and advertising systems, and social features. Along with these opportunities, however, various threats to a user's integrity and privacy may be present. These threats include unauthorized access to, and release of, sensitive user information such as the user's current location or device identifier (ID). Likewise, malicious sending of premium short messaging service (SMS) messages on behalf of the user may occur. Phishing functionality may be cleverly disguised as a legitimate gaming, finance, or other application. Indeed, studies on malware and privacy threats have shown that many mobile applications defeat user expectations in terms of actions that these applications perform, as well as the manner in which these applications utilize user data. These threats certainly impact end users, but a much greater risk is posed to enterprises that support Bring Your Own Device (BYOD) solutions.

Offline analysis and online enforcement are two primary approaches that have been adopted for mitigating privacy and integrity risks in the context of mobile devices. Offline analysis, in the form of dynamic testing or static verification, is configured to detect potential threats before an application is installed on a user's mobile device. As such, offline analysis constitutes the backbone of a vetting process, or—if conducted during application development—a remediation process. Offline analysis has two main disadvantages. First, offline analysis is unable to detect per-device, per-user or per-configuration threats. As an example, a given malware application may perform dynamic code loading and execution only if running on a specific model of mobile device. This is actually a common strategy for evading debugging and analysis tools. A second disadvantage is that offline analysis cannot account for interactions between multiple applications installed on the same mobile device, as it is a user-agnostic (or user-insensitive) approach. Thus, if multiple applications could collude to achieve an attack vector when all of these applications are installed on the same mobile device, this situation would remain undetected using the offline analysis approach.

An alternative to offline analysis is online enforcement. Pursuant to online enforcement, analysis is replaced by runtime monitors and/or code-level hooking mechanisms configured for detecting potential attacks in real time. This functionality reduces some of the shortcomings of the offline analysis approach. However, the overhead required by online enforcement procedures may be significant, especially if online enforcement is expected to be accurate rather than conservative. Likewise, online enforcement is typically constrained to application boundaries without any ability to track threats across different mobile applications.

SUMMARY

The following summary is merely intended to be exemplary. The summary is not intended to limit the scope of the claims.

A method for performing online security analysis, in one aspect, may comprise installing an analysis agent on a mobile device. The analysis agent monitors the mobile device to detect an initiation of installation for a new application that is to be installed on the mobile device. In response to the initiation of installation, the analysis agent quarantines a set of resources corresponding to the new application, analyzes the set of resources to determine whether or not at least one of a potential security threat or a security misconfiguration exists, and, in response to determining that at least one of the potential security threat or the security misconfiguration exists, generates an alert for informing a user that the potential security threat or the security misconfiguration exists.

A method for performing online security analysis, in a further aspect, may comprise installing the analysis agent as a background service on the mobile device. The analysis agent analyzes the set of resources using a model number for the mobile device, or a set of existing applications that are already installed on the mobile device, or the model number and the set of existing applications. In response to generating the alert, a response is received from a user indicative of whether or not the new application should be installed.

A computer program product for performing online security analysis, in another aspect, may comprise a computer-readable storage medium having a computer-readable analysis agent program stored therein, wherein the computer-readable analysis agent program, when executed on a mobile device, causes the mobile device to perform monitoring to detect an initiation of installation for a new application that is to be installed on the mobile device. In response to the initiation of installation, the analysis agent program quarantines a set of resources corresponding to the new application; analyzes the set of resources to determine whether or not at least one of a potential security threat or a security misconfiguration exists; and, in response to determining that at least one of the potential security threat or the security misconfiguration exists, generating an alert for informing a user that the potential security threat or the security misconfiguration exists.

A computer program product for performing online security analysis, in a further aspect, may comprise instructions for installing the analysis agent as a background service on the mobile device. The analysis agent analyzes the set of resources using a model number for the mobile device, or a set of existing applications that are already installed on the mobile device, or the model number and the set of existing applications. In response to generating the alert, a response is received from a user indicative of whether or not the new application should be installed.

An apparatus for performing online security analysis, in another aspect, may comprise a processor and a memory coupled to the processor, wherein the memory comprises instructions which, when executed by the processor, cause the processor to perform installing an analysis agent on a mobile device. The analysis agent monitors the mobile device to detect an initiation of installation for a new application that is to be installed on the mobile device. In response to the initiation of installation, the analysis agent quarantines a set of resources corresponding to the new application, analyzes the set of resources to determine whether or not at least one of a potential security threat or a security misconfiguration exists, and, in response to determining that at least one of the potential security threat or the security misconfiguration exists, generates an alert for informing a user that the potential security threat or the security misconfiguration exists.

An apparatus for performing online security analysis, in a further aspect, may comprise instructions for installing the analysis agent as a background service on the mobile device. The analysis agent analyzes the set of resources using a model number for the mobile device, or a set of existing applications that are already installed on the mobile device, or the model number and the set of existing applications. In response to generating the alert, a response is received from a user indicative of whether or not the new application should be installed.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 1A:
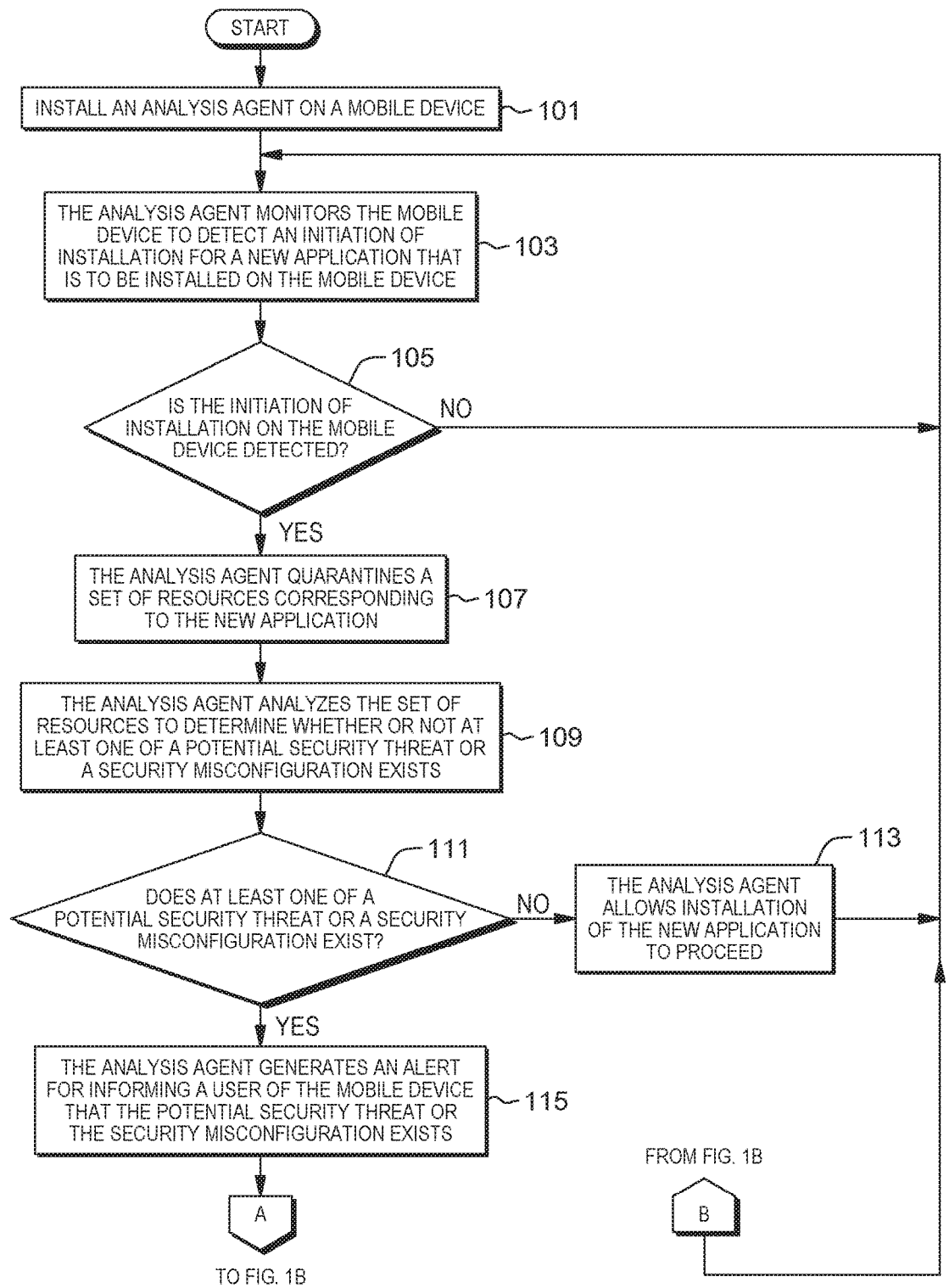
FIGS. 1A and 1B together comprise a flowchart illustrating an exemplary method for performing online security analysis in accordance with one set of embodiments of the present disclosure.
Figure 1B:
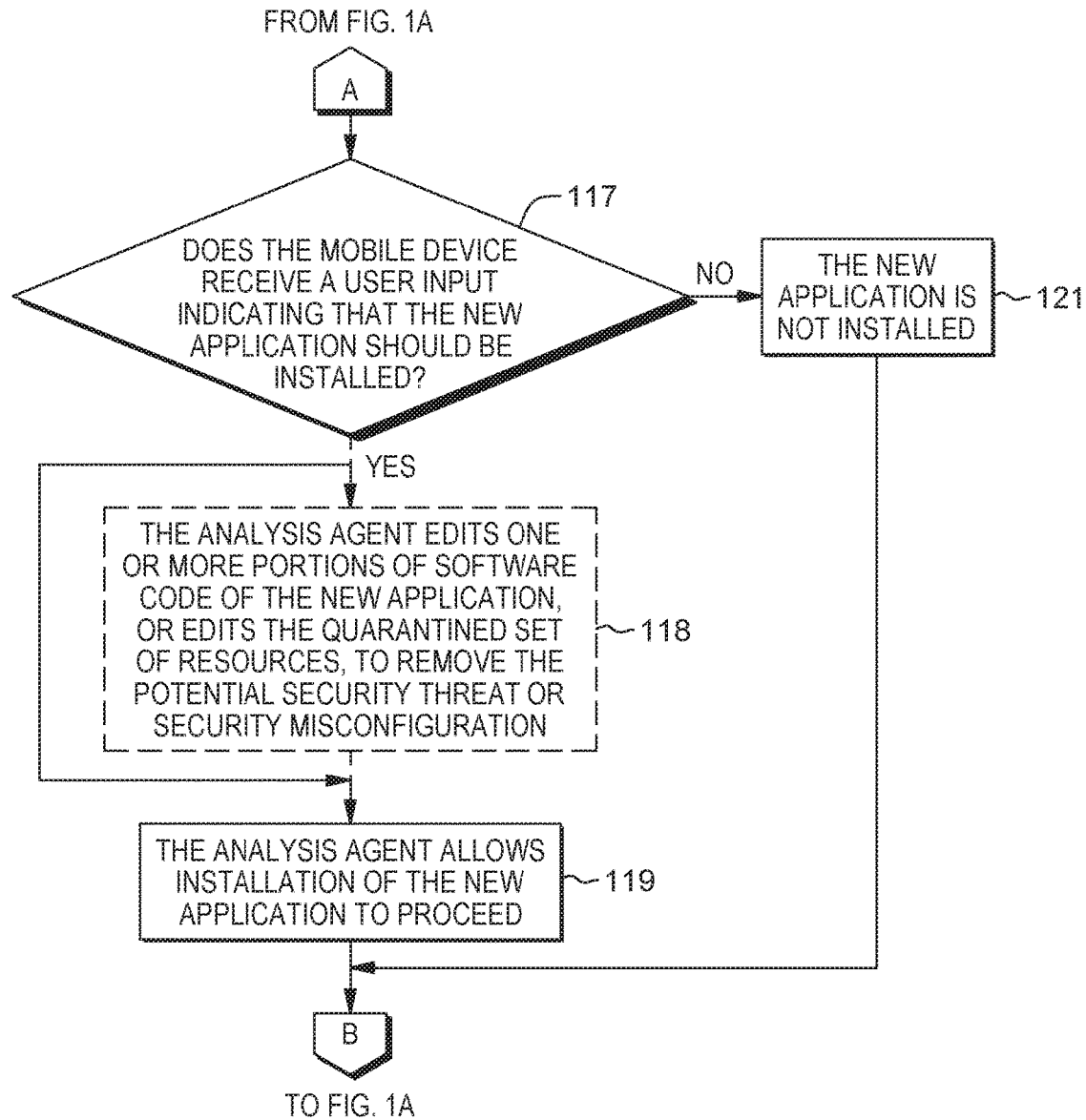

FIGS. 1A and 1B together comprise a flowchart illustrating an exemplary method for performing online security analysis in accordance with one set of embodiments of the present disclosure. The procedure commences at block 101 (FIG. 1A) where an analysis agent is installed on a mobile device. The analysis agent comprises a computer-executable software application that is executed by the mobile device and configured for performing the method of FIGS. 1A and 1B. The analysis agent performs actions for a mobile device user in a relationship of agency, whereby the agent acts on behalf of the user and has the authority to decide which, if any, action is appropriate in a given set of circumstances. Optionally, the analysis agent is executed on the mobile device as a background service.

The method progresses to block 103 where the analysis agent monitors a mobile device to detect an initiation of installation for a new application that is to be installed on the mobile device. The new application, sometimes referred to as an app, may be a self-contained program or piece of software code that is downloaded to the mobile device. Some apps are designed to perform a specific set of functions for the user, or to perform a specific set of functions for another application. For example, a first app may enable a mobile device user to access a bank account, a second app may enable the user to check their heart rate while jogging, and a third app may enable the user to shop online at their favorite store. Although apps often have a specific narrow use, such as shopping, this is not always the case. Other apps are very broad and are configured to perform a lot of tasks. However, apps share one common characteristic—namely, they comprise software code that may be executed by the mobile device.

Pursuant to a set of alternative embodiments disclosed herein, the analysis agent is not automatically installed on the mobile device at block 101. Instead, the operations of blocks 101-103 are replaced by the following optional sequence. The mobile device sends a notification to a remote computer system over a wireless network in response to the user initiating an installation of a new application on the mobile device. In response to the notification, the remote computer system interrogates the mobile device to determine whether or not the mobile device is already equipped with the analysis agent. When the mobile device is not equipped with the analysis agent, the remote computer system retrieves the analysis agent from a storage system, and sends the analysis agent over the wireless network to the mobile device.

At block 105, a test is performed to ascertain whether or not the initiation of installation for the new application has been detected. If an initiation of installation is not detected, the program loops back to block 101. The affirmative branch from block 105 leads to block 107 where the analysis agent quarantines a set of resources corresponding to the new application. Quarantining a set of resources is performed by isolating the resources so that they cannot be opened or executed pending further analysis. The resources are quarantined because they may include one or more potential security threats or security misconfigurations. Hacking has developed from a pastime with bragging rights to a serious, high-money business with innocent users as the victims. Governments all over the world have enacted regulations regarding the security of personal information (often referred to as privacy), with significant civil and criminal penalties behind these regulations.

The program progresses to block 109 where the analysis agent analyzes the quarantined set of resources to determine whether or not at least one of a potential security threat or a security misconfiguration exists. A security misconfiguration refers to selecting inappropriate settings in one or more built-in security measures that are utilized in production-ready software applications. These built-in security measures comprise one or more tasks such as setting up firewall rules and exceptions, denying access by default, requiring passwords where appropriate, changing default passwords, and making sure that the latest security updates and patches have been downloaded and installed. Optionally, the analysis agent performs block 109 by considering one or more of a device model for the mobile device, and a set of existing applications that are currently stored on the mobile device. Accordingly, the analysis agent performs a device-sensitive, closed-world analysis of the quarantined set of resources.

Illustratively, the analysis agent performs block 109 by analyzing the quarantined set of resources to determine at least one of whether or not a confidentiality of data is protected within the application, whether or not the application will be available on demand, or whether or not data integrity is preserved within the application. Data confidentiality is protected when data cannot be read from an unsecured communications link during transit, and when data cannot be stolen while the data is at rest in a computer-readable memory device of the mobile phone.

One tool in securing data confidentiality is encryption. Thus, for illustrative purposes, the analysis agent may analyze the quarantined set of resources by determining whether or not the resources utilize encryption. IT the resources utilize encryption, then the new application may be regarded as not including a potential security threat or a security misconfiguration. If the resources do not utilize encryption, then the new application may be regarded as including a potential security threat or a security misconfiguration. The analysis agent basing its analysis on the presence or absence of encryption is discussed herein for purposes of illustration, as the analysis agent may use other factors in lieu of, or in addition to, encryption in order to determine the existence or absence of potential security threats and security misconfigurations.

Some examples of encryption standards include Transport Layer Security (TLS) and its predecessor, Secure Sockets Layer (SSL), both of which are sometimes referred to as "SSL". TLS and SSL are cryptographic protocols that provide communications security over a computer network or wireless network. For example, the Amazon.com website protects a user's shopping experience using TLS and SSL. Another encryption standard is Triple Data Encryption Algorithm (3DES). 3DES applies a cipher algorithm three times to each of a plurality of data blocks. Yet another encryption standard is Advanced Encryption Standard (AES), sometimes referred to as Rijndael encryption. AES was established by the U.S. National Institute of Standards and Technology (NIST) in 2001. Rijndael utilizes a family if ciphers with different key and block sizes. For AES, NIST selected three members of the Rijndael family, each with a block size of 128 bits, but using three different key lengths: 128, 192, and 256 bits. The algorithm used by AES is a symmetric-key algorithm, meaning that the same key is used for both encrypting and decrypting data. Thus, the analysis agent may analyze the quarantined set of resources by determining whether or not the resources utilize encryption, such as SSL, TLS, 3DES, AES, or another type of encryption.

Another factor that the analysis agent may consider when performing block 109 is evaluating whether or not the application is susceptible to a script injection or a cross-site script. By design, many applications must be able to decrypt data while in transit or at rest. A malicious user seeks to capture data from within an application by manipulating the application in such a way as to gain access to data that the malicious user would otherwise be unable to access. Some of the most common security threats take the form of cross-site scripting or script injection, where a hacker instructs the application (whether running on a server or on a browser of the mobile device) to disclose data to a destination specified by the hacker.

Yet another factor that the analysis agent may consider when performing block 109 is whether or not any restraints may exist related to the availability of the application. Consider, for example, a hydroelectric power generating station at a dam. Imagine what would happen if the dam's control application were to suddenly become unavailable. At best, power could be interrupted. At worst, the dam could release torrents of water and threaten downstream inhabitants. Availability refers to an application being in a ready state, able to process inbound and outbound transactions. The analysis agent may determine whether or not the application is robust enough to handle unexpected data such as large numbers, or a text input when integers are expected. Likewise, the analysis agent may determine whether or not the application can handle rapid, continuous interrupted requests without going down. By interrupting application availability, a hacker can achieve various goals such as denying users the application's functionality or denying revenue that may be generated by the application.

Still another factor that the analysis agent may consider in performing block 109 is the integrity of data that will be processed by the application. For example, an office worker who ordered a full-length wool overcoat and received a pink leather jacket would appreciate the value of maintaining data integrity. Data integrity may be defined as preserving data within the application such that the application produces an outcome that is expected. If the office worker orders item number 15515 (for example, a wool jacket), they expect to receive that item and not item 14435 (for example, a pink leather jacket). Likewise, if this worker earns $52,500 a year, they would expect to be paid $4375 per month (before taxes and deductions). A hacker aims to disrupt business operations by changing the value of data within a system, sometimes to disrupt a company and its reputation, and sometimes to skim money from a company through a series of small transactions. For example, a hacker may be able to modify another user's order in a database, thereby causing delivery of a pink leather jacket instead of a full-length wool overcoat. A malicious hacker may hack into a human resources (HR) database and modify their salary to include a few hundred extra dollars—for instance, modifying a $4375 monthly salary to $4775. Thus, applications should be developed to provide immunity to outside influences during data processing and transmission.

A test is performed at block 111 to ascertain whether or not at least one of a potential security threat or a security misconfiguration exists. If not, the program progresses to block 113 where the analysis agent allows installation of the new application to proceed. The affirmative branch from block 111 leads to block 115 where an alert is generated for informing the mobile device user that the potential security threat or security misconfiguration exists.

The program progresses to block 117 (FIG. 1B) where the mobile device performs a test to ascertain whether or not a user input has been received indicating that the new application is installed. If so, the program progresses either to block 119, or to optional block 118. At optional block 118, the analysis agent edits one or more portions of software code for the new application, or edits the quarantined set of resources, to remove the potential security threat or security misconfiguration. The program then progresses to block 119 where the analysis agent allows installation of the new application to proceed. The negative branch from block 117 leads to block 121 where the new application is not installed.

Figure 2:
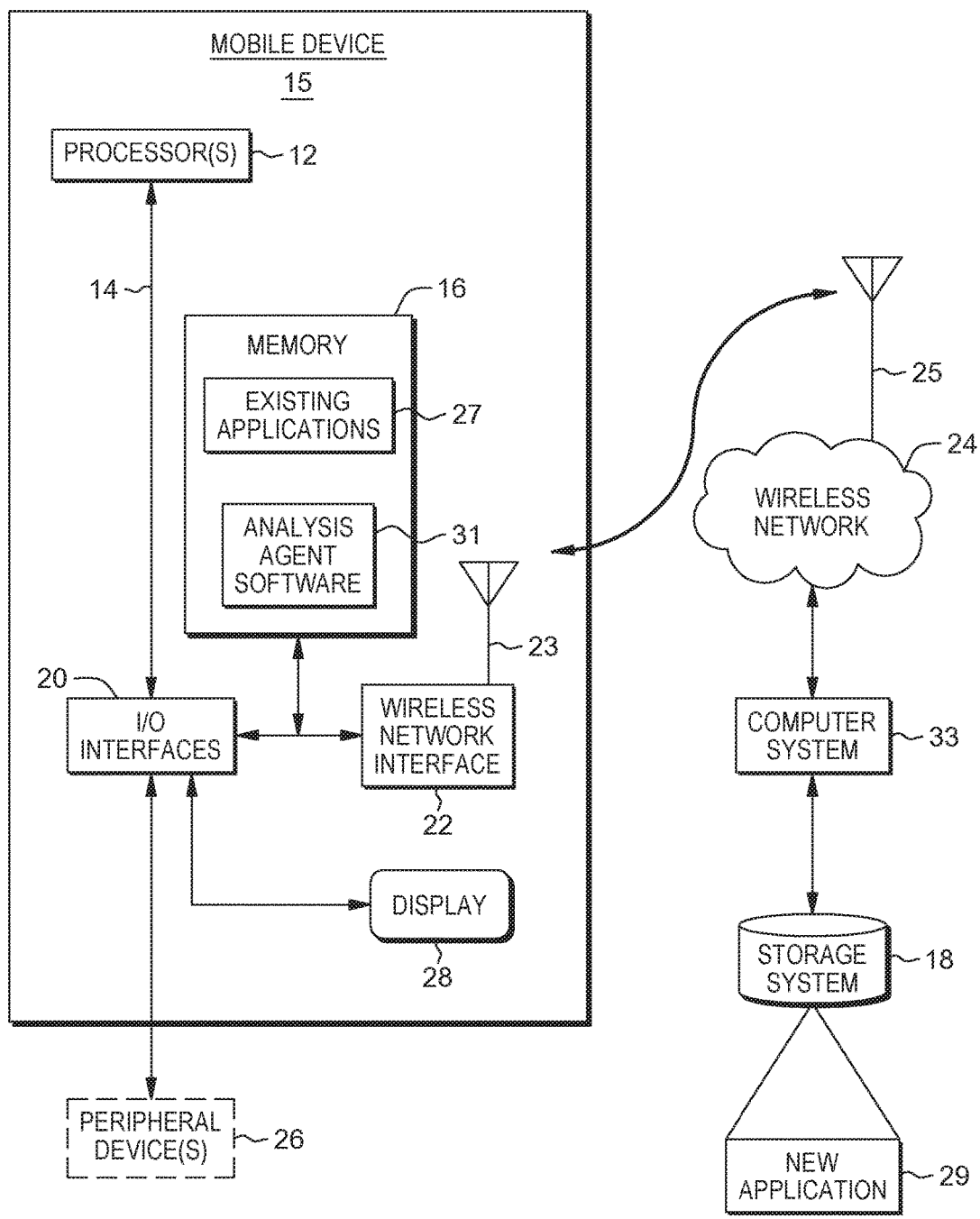
FIG. 2 is a hardware block diagram of an exemplary apparatus for performing online security analysis in accordance with procedure of FIGS. 1A and 1B.

FIG. 2 illustrates a schematic of an exemplary mobile device 15 that may implement the method of FIGS. 1A-1B, in one set of embodiments of the present disclosure. The mobile device 15 is a portable computing device. Some illustrative examples of the mobile device 15 include a smartphone, a tablet computer, a cellphone, a personal digital assistant (PDA), a portable communications device, or a navigation system. The mobile device 15 is only one example of a suitable processing system and is not intended to suggest any limitation as to the scope of use or functionality of embodiments of the methodology described herein.

The mobile device 15 includes one or more processors 12 operatively coupled to a computer-readable memory 16. The memory 16 can include computer system readable media in the form of volatile memory, or non-volatile memory, or any of various combinations thereof. Some illustrative examples of volatile memory include random access memory (RAM) and/or cache memory, or other types of memory devices, or any of various combinations thereof. Some illustrative examples of non-volatile memory include read-only memory (ROM), magnetic media such as a "hard drive", a solid-state storage drive, or an optical disk drive. The memory 16 includes an operating system (OS) that is executed by the one or more processors 12. Illustrative examples of operating systems include Andriod™ and Apple iOS™. The one or more processors 12 are configured to execute various types of software applications, sometimes referred to as apps.

The one or more processors 12 may be described in the general context of computer system executable instructions, such as program modules, being executed by a computer system. Generally, program modules may include routines, programs, objects, components, logic, data structures, and so on that perform particular tasks or implement particular abstract data types. Thus, the one or more processors 12 may include a module that performs the methods described herein with reference to FIGS. 1A and 1B. The module may be programmed into the integrated circuits of the one or more processors 12, or loaded from the memory 16, or the wireless network 24, or any of various combinations thereof.

The mobile device 15 may be operational with numerous other general purpose or special purpose computing system environments or configurations. Thus, the mobile device 15 includes a wireless network interface 22 coupled to a first antenna 23. The wireless network interface 22 and the first antenna 23 are configured for communicating with a wireless network 24 that is coupled to a second antenna 25. The wireless network 24 is operatively coupled to a computer system 33. Accordingly, a notification may be sent from the mobile device 15 to the computer system 33 over the wireless network 24 in response to a user of the mobile device 15 initiating an installation of a new application on the mobile device. In response to the notification, the computer system 33 interrogates the mobile device 15 to determine whether or not the mobile device 15 is already equipped with an analysis agent software 31. When the mobile device 15 is not equipped with the analysis agent software 31, the computer system 33 retrieves the analysis agent software 31 from a storage system 18, and sends the analysis agent software over the wireless network 24 to the mobile device 15, as was previously described in connection with block 101 of FIG. 1A.

Illustratively, the wireless network interface 22 is configured for implementing wireless communication using a wireless standard such as Global System for Mobile Communications (GSM), Universal Mobile Telecommunications System (UMTS), Code Division Multiple Access (CDMA), Long-Term Evolution (LTE), 2G, 3G, 4G, 5G, Near Field Communications (NFC), WiFi, WiMAX, or Bluetooth. In general, these wireless standards are configured for efficiently dividing the finite RE spectrum among multiple users. For example, GSM uses time-division multiple access (TDMA) and frequency-division multiple access (FDMA) to provide separation among users and cells. UMTS and CDMA-2000 use code-division multiple access (CDMA). WiMAX and LTE use orthogonal frequency division multiplexing (OFDM). Illustratively, the mobile device 15 uses one or more of the foregoing wireless standards to access the Internet through the wireless network 24.

TDMA provides mobile device 15 access to the wireless network 24 by chopping up a physical RE communications channel occupying a given frequency bandwidth into sequential time slices. Each user of the channel takes turns to transmit and receive signals. In reality, only one mobile device 15 is actually using the channel at any specific moment in time. This is analogous to time-sharing on a large computer server. FDMA provides multi user access by separating the frequencies used by each of a plurality of mobile devices such as the mobile device 15. In GSM, the FDMA approach is used to separate each of a plurality of cells of the wireless network 24, and then TDMA is used to separate each of a plurality of mobile device 15 users within the cell.

CDMA uses spread-spectrum digital modulation to spread voice data over a very wide channel in pseudorandom fashion using a mobile device 15-specific or cell-specific pseudorandom code. A receiver at the wireless network 24 undoes the randomization to collect the bits together and produce the original voice data. As the codes are pseudo-random and selected in such a way as to cause minimal interference to one another, multiple users can talk at the same time and multiple cells can share the same frequency. This causes an added signal noise forcing all users to use more power, which in exchange decreases cell range and battery life.

Orthogonal Frequency Division Multiple Access (OFDMA) uses bundling of multiple small frequency bands that are orthogonal to one another to provide for separation of mobile device 15 users. The users are multiplexed in the frequency domain by allocating specific sub-bands to individual users. This is often enhanced by also performing TDMA and changing the allocation periodically so that different users are assigned different sub-bands at different times. The foregoing wireless standards are provided solely for purposes of illustration, as the mobile device 15 may be configured for communicating with the wireless network 24 using any communications standard.

The mobile device 15 includes an input/output (I/O) interface 20. The I/O interface is used to interface the one or more processors 12 to the wireless network interface 22, a display 28, and one or more optional peripheral devices 26 such as a keyboard, a pointing device, or one or more devices that enable a user to interact with the mobile device 15. The display 28 may be provided in the form of a touch-sensitive screen and/or a miniature keyboard. The touch-sensitive screen may be configured to accept a tactile input or a stylus input, or both. The optional peripheral devices 26 may also include any device, such as a network card or a modem, that enables the mobile device 15 to communicate with one or more other computing devices. Such communication can occur via the I/O interface 20.

The computer system 33 may include a variety of computer system readable media. Such media may be any available media that is accessible by computer system, and it may include both volatile and non-volatile media, removable and non-removable media. In the example of FIG. 2, the computer system 33 is configured for accessing a storage system 18 on which at least one new application 29 is stored. The computer system 33 may be described in the general context of computer system executable instructions, such as program modules, being executed by a computer system. Generally, program modules may include routines, programs, objects, components, logic, data structures, and so on that perform particular tasks or implement particular abstract data types. Examples of well-known computing systems, environments, and/or configurations that may be suitable for implementing the computer system 33 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 33 may be practiced in distributed cloud computing environments where tasks are performed by remote processing devices that are linked through a communications network such as the wireless network 24. In a distributed cloud computing environment, program modules may be located in both local and remote computer system storage media including memory storage devices such as the storage system 18.

The computer system 33 may further include other removable/non-removable, volatile/non-volatile computer system storage media. By way of example only, the storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

Both the mobile device 15 and the computer system 33 can communicate with one or more networks, such as the wireless network 24, a local area network (LAN), a general wide area network (WAN), and/or a public network (e.g., the Internet). It should be understood that although not shown, other hardware and/or software components could be used in conjunction with the computer system 33. Examples include, but are not limited to: microcode, device drivers, redundant processing units, external disk drive arrays, RAID systems, tape drives, and data archival storage systems, etc.

The mobile device 15 may be equipped with a source of battery power. Optionally, the mobile device 15 may also be equipped with a Global Positioning System (GPS) receiver for utilizing one or more location-based services. Other optional features of the mobile device 15 may include a camera, a media player for playing back video or music files, or one or more sensors. Such sensors may include an accelerometer, a compass, a magnetometer, or a gyroscope, allowing detection of orientation of motion. Optionally, the mobile device 15 may provide biometric user authentication, such as using a built-in camera for facial recognition or using a fingerprint sensor for fingerprint recognition.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for performing online security analysis, the method comprising:
    installing, using a hardware processor of a mobile device, an analysis agent on a mobile device;
    the analysis agent configuring the hardware processor for monitoring the mobile device to detect an initiation of installation for a new application that is to be installed on the mobile device;
    in response to the initiation of installation, the hardware processor:
        quarantining, at the mobile device, a set of resources corresponding to the new application;
        analyzing, at the mobile device, the set of resources to determine whether or not at least one of a potential security threat or a security misconfiguration exists, said analyzing the set of resources further comprising: determining a set of existing applications that are already installed and running on the mobile device at a time of analysis and that interact, and further determining, at the mobile device, presence of any restraints in handling unexpected text, data or numbers rendering the new application at the mobile device unavailable to rapidly process inbound and outbound transactions on demand; and
        in response to determining that the new application is unavailable on demand, generating, by the hardware processor, an alert via user interface at said mobile device for informing a user that the potential security threat or the security misconfiguration exists.

2. The method of claim 1 further comprising the mobile device executing the analysis agent as a background service.

3. The method of claim 1 wherein analyzing the set of resources further comprises using a model number for the mobile device.

4. The method of claim 1 further comprising, in response to the alert, receiving a response from a user indicative that the new application should be installed.

5. The method of claim 4 further comprising the analysis agent editing one or more portions of software code of the new application, or editing the quarantined set of resources, to remove the potential security threat or the security misconfiguration.

6. The method of claim 1 wherein analyzing the quarantined set of resources further comprises determining at least one of whether or not a confidentiality of data is protected within the new application, or whether or not data integrity is preserved within the new application.

7. A computer program product for performing online security analysis comprises a computer-readable storage medium having a computer-readable analysis agent program stored therein, wherein the computer-readable analysis agent program, when executed on a mobile device, causes the mobile device to perform:
    monitoring to detect an initiation of installation for a new application that is to be installed on the mobile device;
    in response to the initiation of installation, the analysis agent program:
    quarantining, at the mobile device, a set of resources corresponding to the new application;
    analyzing, at the mobile device, the set of resources to determine whether or not at least one of a potential security threat or a security misconfiguration exists, said analyzing the set of resources further comprising: determining a set of existing applications that are already installed and running on the mobile device at a time of analysis and that interact, and further determining, at the mobile device, presence of any restraints in handling unexpected text, data or numbers rendering the new application at the mobile device unavailable to rapidly process inbound and outbound transactions on demand; and
    in response to determining that the new application is unavailable on demand, generating an alert for informing a user that the potential security threat or the security misconfiguration exists.

8. The computer program product of claim 7 further configured for execution as a background service.

9. The computer program product of claim 7 further configured for analyzing the set of resources using a model number for the mobile device.

10. The computer program product of claim 7 further configured for receiving a response from a user, in response to the alert, indicative that the new application should be installed.

11. The computer program product of claim 10 further configured for editing one or more portions of software code of the new application, or editing the quarantined set of resources, to remove the potential security threat or the security misconfiguration.

12. The computer program product of claim 7 further configured for analyzing the quarantined set of resources by determining at least one of whether or not a confidentiality of data is protected within the new application, or whether or not data integrity is preserved within the new application.

13. An apparatus for performing online security analysis, the apparatus comprising a processor and a memory coupled to the processor, wherein the memory comprises instructions which, when executed by the processor, cause the processor to perform:
   installing an analysis agent on a mobile device;
   the analysis agent monitoring the mobile device to detect an initiation of installation for a new application that is to be installed on the mobile device;
   in response to the initiation of installation, the analysis agent:
      quarantining, at the mobile device, a set of resources corresponding to the new application;
      applying, at the mobile device, the analysis agent to the set of resources to determine whether or not at least one of a potential security threat or a security misconfiguration exists, said analyzing the set of resources further comprising: determining a set of existing applications that are already installed and running on the mobile device at a time of analysis and that interact, and further determining, at the mobile device, presence of any restraints in handling unexpected text, data or numbers rendering the new application at the mobile device unavailable to rapidly process inbound and outbound transactions on demand; and
      in response to determining that the new application is unavailable on demand, generating an alert for informing a user that the potential security threat or the security misconfiguration exists.

14. The apparatus of claim 13 further configured for execution as a background service, and further configured for analyzing the set of resources using a model number for the mobile device.

15. The apparatus of claim 13 further configured for receiving a response from a user, in response to the alert, indicative that the new application should be installed.

16. The apparatus of claim 15 further configured for editing one or more portions of software code of the new application, or editing the quarantined set of resources, to remove the potential security threat or the security misconfiguration.

17. The apparatus of claim 13 further configured for analyzing the quarantined set of resources by determining at least one of whether or not a confidentiality of data is protected within the new application, or whether or not data integrity is preserved within the new application.

\* \* \* \* \*